United States Patent [19]

Heiniger et al.

[11] 4,160,587
[45] Jul. 10, 1979

[54] CAMERA EQUIPPED WITH RANGE FINDER FOR MANUAL OR AUTOMATIC FOCUSING

[75] Inventors: Wilfred Heiniger; Claude Kreienbuehl; Manuel Millan, all of Yverdon, Switzerland

[73] Assignee: Bolex International S.A., Ste-Croix, Switzerland

[21] Appl. No.: 838,377

[22] Filed: Sep. 30, 1977

Related U.S. Application Data

[63] Continuation-in-part of Ser. No. 787,497, Apr. 14, 1977, abandoned, and Ser. No. 789,250, Apr. 20, 1977, abandoned.

[30] Foreign Application Priority Data

Oct. 1, 1976 [CH] Switzerland .................. 012428/76

[51] Int. Cl.² .......................................... G03B 7/08
[52] U.S. Cl. ................................................ 354/25
[58] Field of Search ............... 354/25, 163; 350/46; 352/140; 355/56; 356/1, 4; 250/201

[56] References Cited

U.S. PATENT DOCUMENTS

| | | | |
|---|---|---|---|
| 3,435,774 | 4/1969 | Stimson | 354/25 |
| 3,838,275 | 9/1974 | Stauffer | 354/195 X |
| 3,958,117 | 5/1976 | Stauffer | 354/25 X |
| 4,002,899 | 1/1977 | Stauffer | 354/25 X |
| 4,021,821 | 5/1977 | Peterson | 354/25 |

*Primary Examiner*—Michael L. Gellner
*Attorney, Agent, or Firm*—Montague & Ross

[57] ABSTRACT

A camera with a focusable objective has two secondary projection systems, at least one of which is continuously adjustable, working into a photoelectric comparator which emits a coincidence signal whenever the two projection systems are trained upon the same object along the optical axis of the main objective. A position sensor, coacting with a swingable mirror in the adjustable projection system, generates a correlation signal whenever the mirror position matches the setting of the main objective as determined by the axial position of a shiftable lens member thereof. With the swingable mirror set in oscillations to scan the object space in front of the main objective, the two signals are generated in the form of short pulses during each scanning sweep and are fed to a phase detector whose output may control a drive motor for the shiftable lens member to bring the main objective into correct focus. The position sensor may include a source of an ancillary light beam, not necessarily within the visible spectrum, and a photoelectric detector therefor; the elements determining the orientation of that light beam (source, detector and/or reflecting surfaces) are then located at least in part on the swingable mirror and on a carrier for the focusing lens member. If the secondary projection systems include a pair of stationary reflectors in a region of the objective in which the light rays from an object on its axis are parallel to that axis when the objective is focused thereon, the swingable mirror can be replaced by a stationary one while the comparator acts as the position sensor.

23 Claims, 23 Drawing Figures

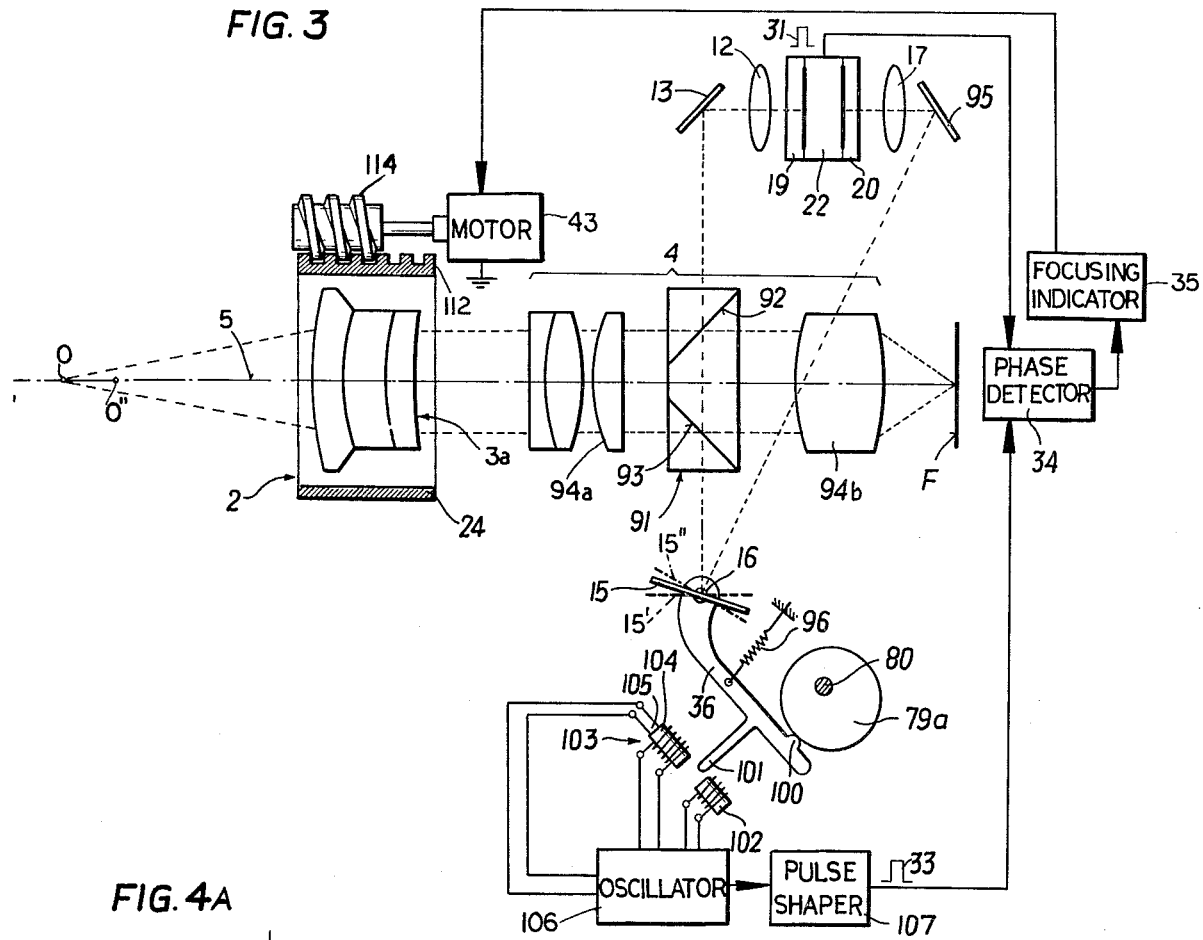
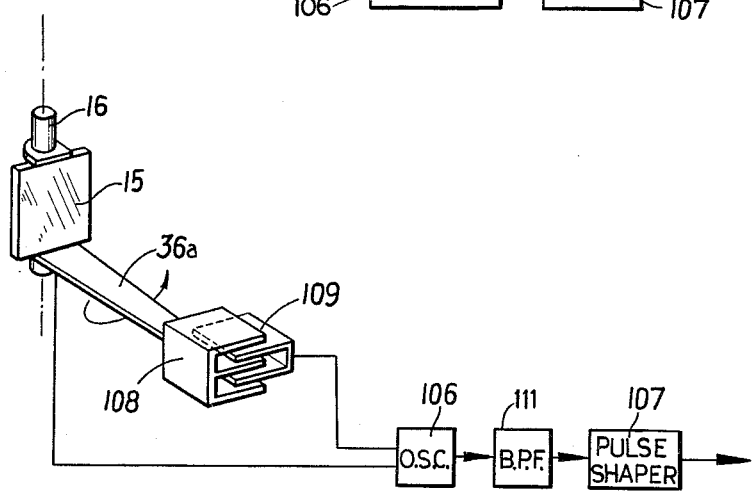
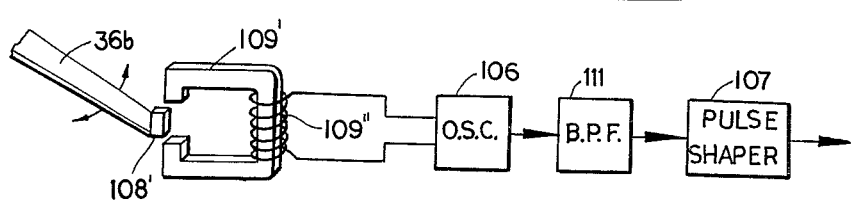

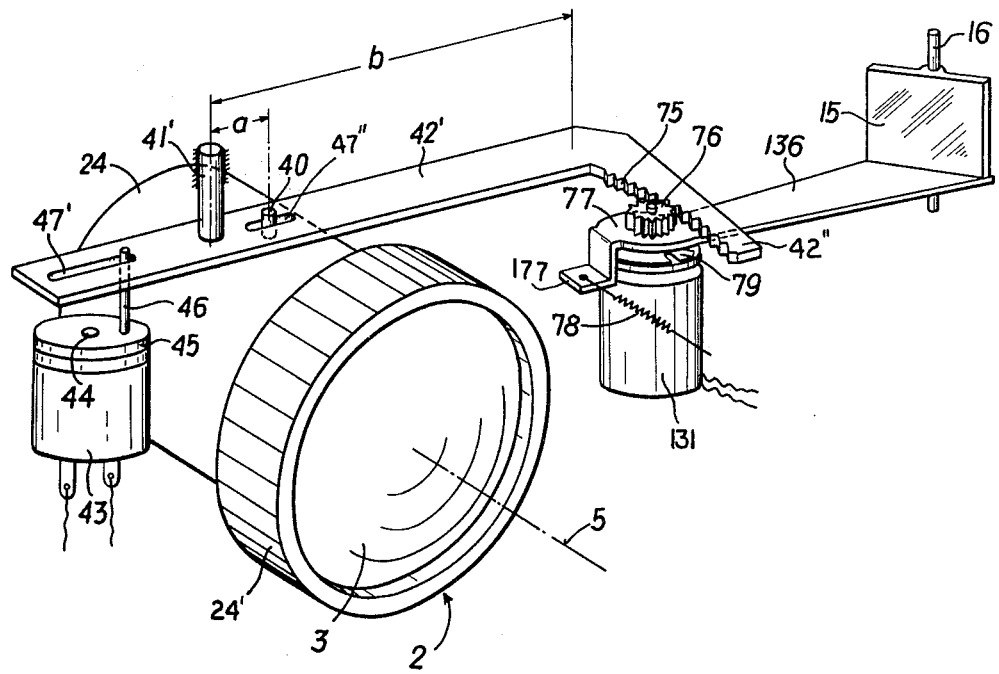
FIG. 16A
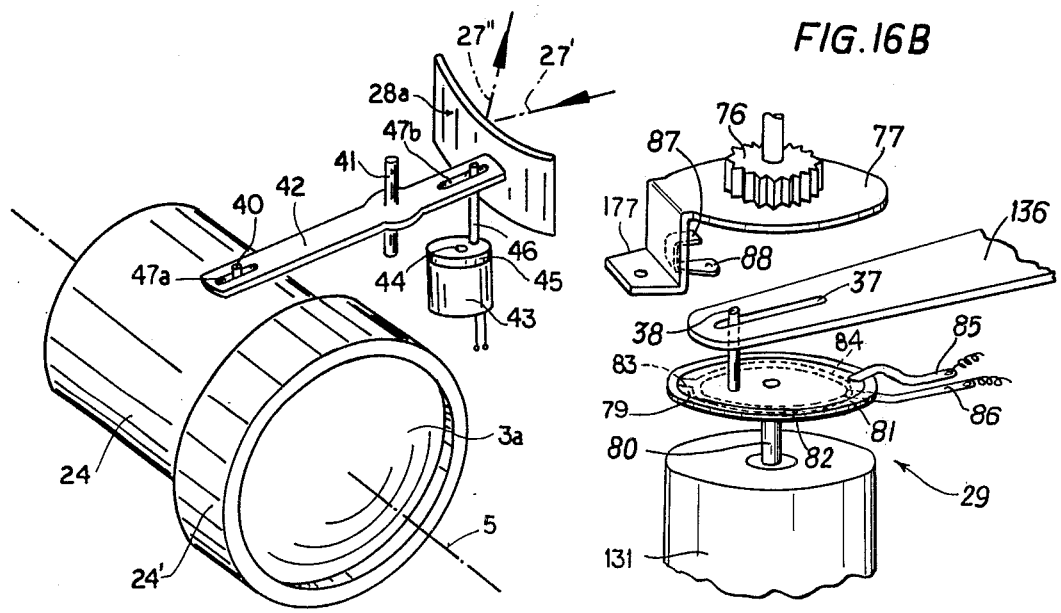
FIG. 16B
FIG. 11

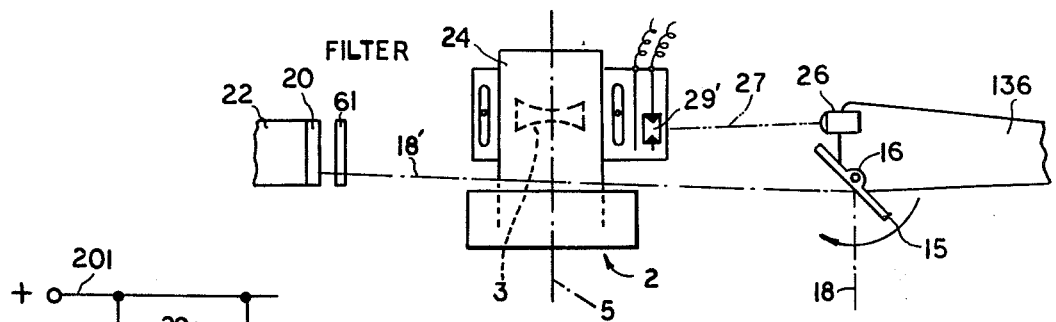
FIG. 13
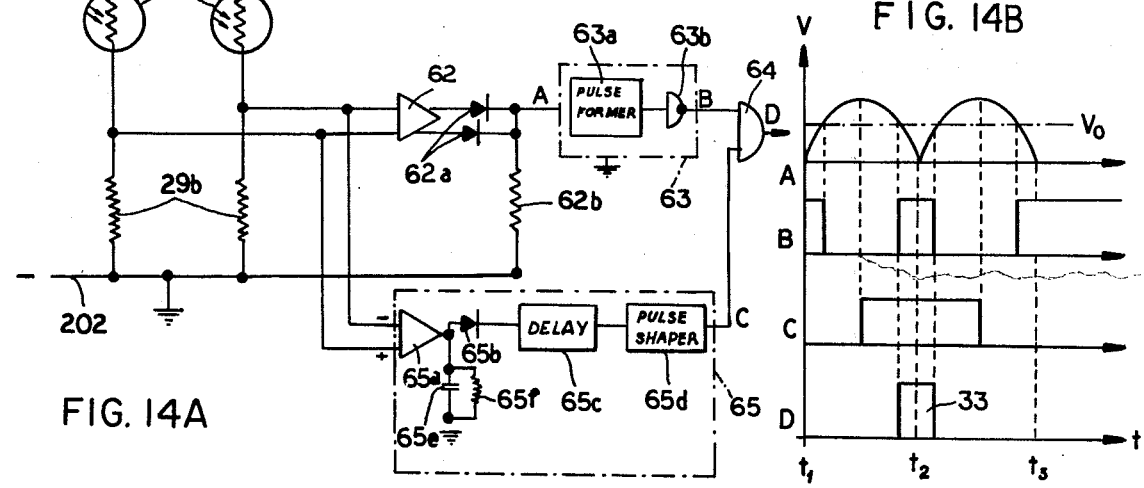
FIG. 14A
FIG. 14B
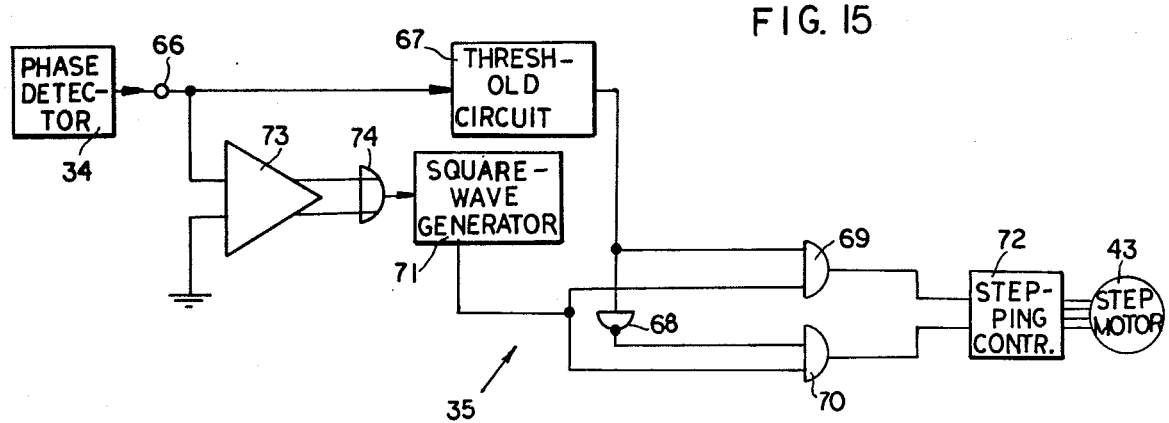
FIG. 15

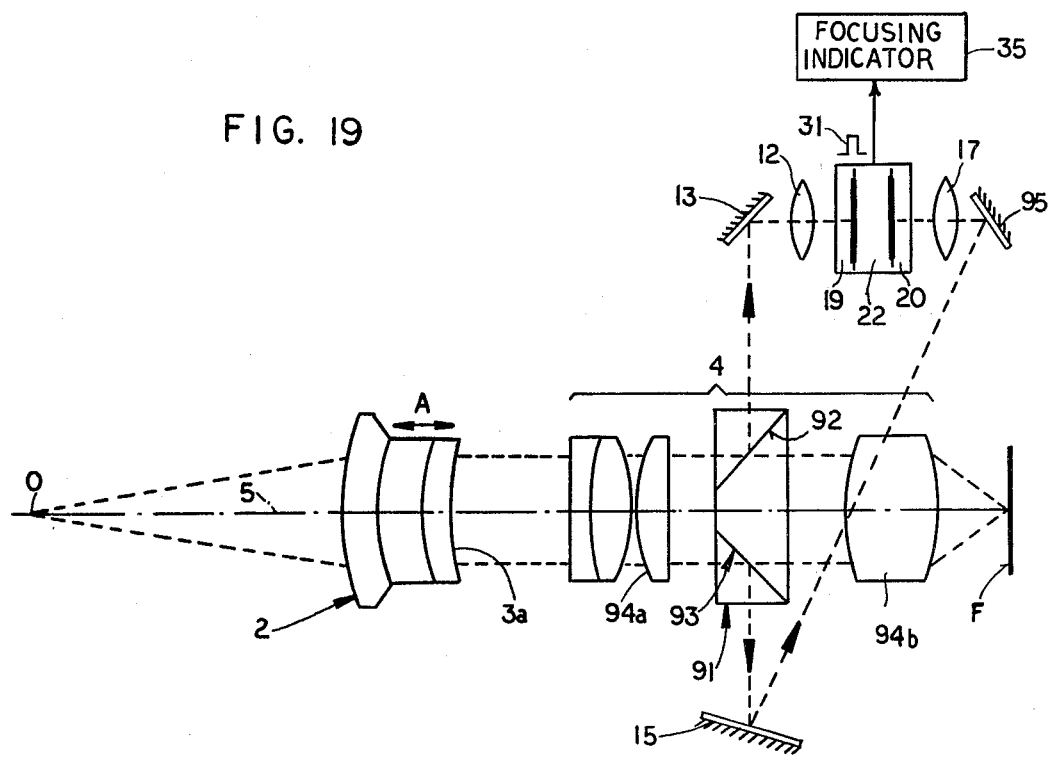

CAMERA EQUIPPED WITH RANGE FINDER FOR MANUAL OR AUTOMATIC FOCUSING

CROSS-REFERENCE TO RELATED APPLICATIONS

This is a continuation-in-part of our copending applications Ser. Nos. 787,497, filed Apr. 14, 1977, and 789,250, filed Apr. 20, 1977, both now abandoned.

FIELD OF THE INVENTION

Our present invention relates to a photographic or cinematographic camera with a focusable objective in which an automatic range finder determines the correct focusing position.

BACKGROUND OF THE INVENTION

In U.S. Pat. No. 3,435,744 there has been described an automatic focusing system in which the distance of an object from the camera is determined by training a beam of light upon such object and receiving reflections of that beam on a photocell which is laterally offset from the location of the beam source, the photocell being part of an ancillary optical system which is angularly oscillatable in a scanning sweep to let its own axis intersect the beam axis at different distances from the camera objective. The optical system is mechanically linked with a device for focusing the camera objective by axially displacing one of its lens members.

U.S. Pat. No. 3,838,275 describes a photoelectric comparator designed to determine a coincidence between two projected images produced by respective branches of a range finder, the comparator comprising two arrays of photocells each illuminated by discrete image portions. When the two cell arrays have identical outputs, the projected images are presumed to register with each other. A similar system is disclosed in U.S. Pat. No. 3,844,658.

OBJECTS OF THE INVENTION

An object of our present invention is to provide means in such a camera enabling the correct focusing thereof without the need for a mechanical linkage between an optical range finder and a movable lens member of the camera objective.

A related object is to provide, in a camera whose objective is focusable with the aid of an electric motor, means for automatically arresting the focusing drive in the correct position.

It is also an object of our invention to provide means for signaling the correct focusing position without the need for a scanning displacement of an ancillary optical system.

SUMMARY OF THE INVENTION

In accordance with a feature of our present invention, a camera having setting means for the focusing of its objective comprises a pair of ancillary projection systems intercepting incident light rays from an object in line with that objective, at least one of these ancillary projection systems including adjustable light-guiding means mechanically independent of the aforementioned setting means for varying the relative positions of the intercepted light rays. These light rays illuminate a photoelectric comparator which emits a coincidence signal whenever the two projection systems are trained upon the same object, as indicated by the fact that images respectively produced by these systems register with each other. The setting means and the light-guiding means work into a sensing system which generates a correlation signal upon detecting an agreement between the focusing position of the objective and the instant position of the light-guiding means to indicate that the ancillary projection systems are trained upon a point on the axis of the camera objective on which the latter is focused, regardless of whether or not an object to be photographed is situated at that point. Upon a periodic scanning displacement of the light-guiding means to explore the object space in front of the camera in a succession of sweeps, the correlation and coincidence signals appear in the form of short pulses during each sweep which are fed to a phase detector for determining the relative time position of these pulses as an indication of the manner in which the objective must be refocused with the aid of the aforementioned setting means in order to provide a sharp picture.

Thus, when the phase comparator detects a concurrence of the correlation and coincidence pulses, it may produce an in-focus signal arresting the focusing drive and/or tripping the camera shutter.

We prefer to design the displaceable light-guiding means as a swingable mirror which may be mechanically linked with a position indicator forming part of the aforementioned sensing system. This mechanical linkage advantageously includes a motion-amplifying transmission such as a lever in order to magnify the relatively small mirror oscillations as reproduced by the position indicator. Such a motion-amplifying transmission may also be inserted between the sensing system and the focusing drive. Instead of a mechanical linkage, according to a further feature of this invention, we may use an optical coupling between the swingable mirror and the sensing system, such a coupling including an auxiliary source of visible or invisible radiation.

Pursuant to another aspect of our invention, the two ancillary projection systems include a pair of stationary light reflectors interposed between two further lens members of the camera objective between which there is established a field of parallel light rays whenever that objective is focused upon a lighted object. In that case, the light rays intercepted by these reflectors and directed away from the optical axis in the form of a pair of beams, focused upon respective inputs of the photoelectric comparator, will produce registering images only in the presence of such a parallel-ray field, i.e. when the camera objective is properly in focus. With such an arrangement, therefore, no scanning movement is required and the photoelectric comparator acts not only as a coincidence indicator but also as a position sensor.

BRIEF DESCRIPTION OF THE DRAWING

The above and other features of our invention will now be described in detail with reference to the accompanying drawing in which:

FIG. 3 is a more detailed schematic view of the principal components of the camera shown in FIG. 1, including a position sensor associated with the range finder of FIG. 2;

FIG. 4A diagrammatically shows a modified position sensor for the camera of FIG. 3;

FIG. 4B is a view similar to FIG. 4A, illustrating another modification of the position sensor;

FIG. 11 is a perspective view diagrammatically showing a modified sensor of the type illustrated in FIG. 10;

FIG. 13 is a plan view of a position sensor representing yet another modification;

FIG. 14A is a circuit diagram for a position sensor of the general type shown in FIGS. 10–13;

FIG. 14B is a set of graphs relating to the circuit diagram of FIG. 14A;

FIG. 15 is a block diagram of a motor-control circuit also forming part of the camera shown in FIG. 1 or FIG. 10;

FIG. 16A is a perspective view of a further type of position sensor suitable for the camera of FIGS. 1 and 3;

FIG. 16B is an exploded perspective view of a detail of the mechanism of FIG. 16A;

FIG. 19 illustrates a modification of the embodiment of FIG. 3.

SPECIFIC DESCRIPTION

Figure 1:
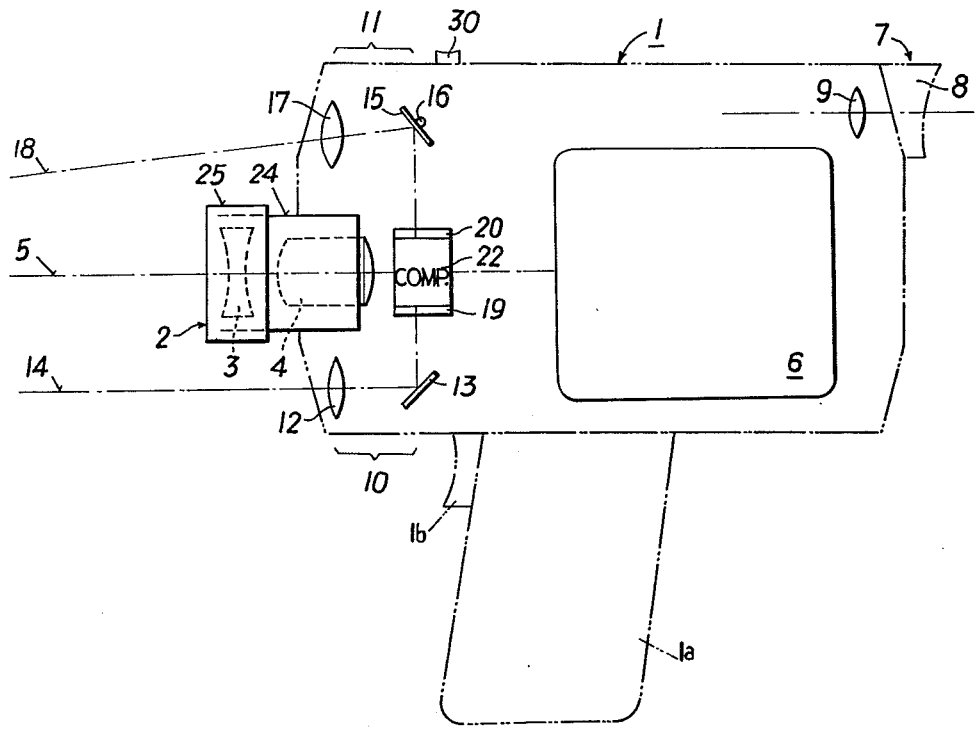
FIG. 1 is a diagrammatic elevational view of a self-focusing camera embodying our invention.

In FIG. 1 we have shown a motion-picture camera 1 comprising an objective 2 which includes several components centered on an optical axis 5, i.e. an axially shiftable lens 3 and a fixed lens group 4, the lenses being received in a lens barrel 24 centered on axis 5. A film cassette 6 is receivable in the camera housing for exposure of its film through a nonillustrated image gate in a manner well known per se. The camera housing has a handle 1a provided with a trigger 1b which operates the film drive.

A conventional view finder 7 includes an eye cup 8 in line with a lens 9.

In accordance with our invention, the camera is provided with two ancillary projection systems 10 and 11 having respective optical axes 14, 18 generally parallel to the main axis 5. Projection system 10 comprises a fixed objective 12 illuminating a stationary mirror 13 which reflects the incident light rays toward an input element 19 of a photoelectric comparator 22; it will be understood that this comparator is offset from the optical axis 5. Projection system 11 similarly comprises an objective 17 illuminating a mirror 15 which, however, is swingable about a pivotal axis 16 that reflects the incident light rays toward another input element 20 of a comparator 22. A pushbutton 30, when depressed, closes a switch (not shown in FIG. 1) for the start of a scanning drive, serving to oscillate the mirror 15 at a high frequency about its pivot 16, and advantageously also a focusing drive for axially reciprocating the movable lens 3 at a substantially slower rate, as more fully described hereinafter. Lens 3, shown to be negatively refracting, may be preceded by a positive front lens not shown in this Figure; in some embodiments described below, it is that front lens and not the lens 3 that is axially shiftable for focusing purposes.

The oscillation of mirror 15, either alone or advantageously together with the associated objective 17, lets the axis 18 intersect the axis 14 at a point in the immediate vicinity of axis 5 whose distance from the objective 2 varies within predetermined limits. When the comparator 22 detects a correspondence of the images projected upon its inputs 19 and 20, it emits a coincidence signal in the form of a brief pulse to indicate that the two systems 10 and 11 are trained upon the same object. A position sensor, described with reference to subsequent Figures, generates a correlation signal in the form of a similar pulse whenever the position of mirror 15 is such that the point of intersection of axes 14, 18 lies substantially in the object plane of objective 2, thus indicating an agreement between the focal setting of that objective and the instantaneous position of the range finder 10, 11, 22. If the two pulses occur at different times, the camera is out of focus and must be readjusted by a manual shifting of lens 3, as with the aid of a conventional setting ring 25, or by continued operation of the electrical focusing drive actuated by the depression of pushbutton 30; upon the simultaneous appearance of the pulses, the focusing mechanism is stopped in the correct position by an automatic deactivation of the drive or by the user observing a visual indicator.

Figure 2:
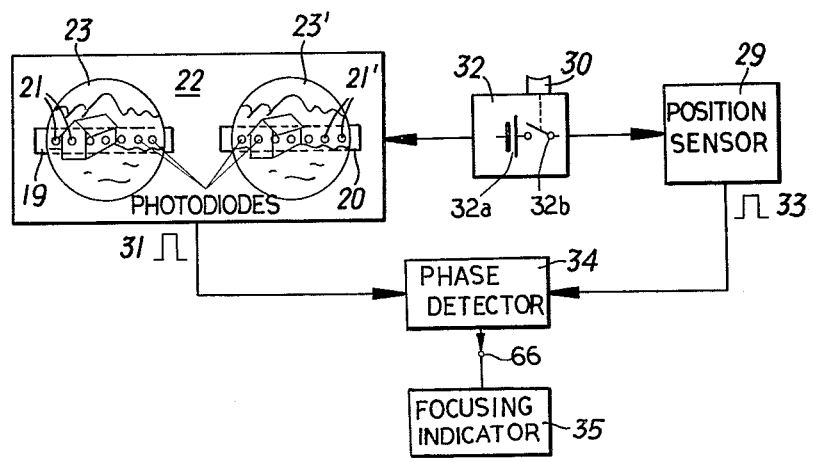
FIG. 2 is a block diagram of the electrical circuitry of a range finder included in the camera of FIG. 1.

In FIG. 2 we have shown details of comparator 22 which is of the general type described in the aforementioned U.S. Pat. No. 3,838,275 and comprises two linear arrays of light-responsive devices 21, 21', such as photodiodes, constituting its input elements 19 and 20; though in FIG. 2 these input elements are shown for convenience as if located in a common plane, they are in reality opposite each other as illustrated in FIG. 1.

A power supply 32 includes a battery 32a and a pushbutton-controlled switch 32b in series therewith. Actuation of pushbutton 30 energizes the comparator 22 as well as a position sensor 29 from which the coincidence and correlation pulses 31 and 33 are transmitted to a phase detector 34. A focusing indicator 35, connected to an output terminal of phase detector 34, responds to an in-focus signal from that detector in the aforedescribed manner, i.e. by interrupting the focusing drive and/or by visually alerting the user to the fact that the correct focal position has been achieved.

In FIG. 3 we have shown a modified focusing arrangement according to our invention for a camera whose objective 2 includes a compound front lens 3a of positive refractivity, movable with the lens barrel 24, followed by lens group 4; two of the components of that group have been designated 94a and 94b. Lens barrel 24 has a rack 112 facilitating its axial displacement by a worm 114 which is driven by a motor 43 (under the control of a pushbutton-operated switch not shown) in the absence of an in-focus signal from indicator 35.

Objective 2 has an image plane, coinciding with the light-sensitive surface of a film F, conjugated with an object plane passing through a point 0 on axis 5 so that an object positioned at that point is sharply imaged on the film. The light rays emanating from such an object are parallel to the axis between components 94a and 94b, in contradistinction to light rays originating at any other point such as 0'. A prism 91 interposed between components 94a, 94b has two internal semireflecting surfaces 92, 93, inclined to the axis at angles of ±45°, which intercept part of the incident light rays and reflect them in radially opposite directions toward mirrors 13 and 15 of two ancillary projection systems similar to those shown in FIG. 1. Stationary mirror 13 is here shown to direct the light rays from surface 92 via lens 12 onto the input 19 of comparator 22 whereas mirror 15 trains its ray bundle by way of another, fixed reflector 95 and lens 17 onto comparator input 20.

The fixed mirrors 13 and 95 are so oriented that a coincidence pulse 31 will be emitted by comparator 22 only when the light rays intercepted by semireflectors 92 and 93 are parallel to the optical axis 5 and when the mirror 15 is in the position indicated in full lines.

Mirror 15 is shown carried by an arm 36, fulcrumed on pivot pin 16, which has a lug 100 riding a cam 79a against whose surface the lever is urged by a spring 96. Cam 79a is secured to a shaft 80, driven by a motor not shown, so as to oscillate the arm 36 and the mirror 15; a multiplicity of such oscillatory cycles occur during a single traverse of lens member 3a under the control of motor 43. During each clockwise swing of the arm, a conductive spur 101 thereof penetrates into an air gap between a pair of electromagnetic coils 102 and 104, the latter forming part of a transformer 103 provided with a secondary winding 105 as more fully illustrated in FIG. 5. These coils lie in the feedback path of an oscillator 106 which works into a pulse shaper 107, such as a monoflop, producing the correlation pulse 33 whenever the spur 101 extends far enough into the air gap to block the generation of oscillations as more fully described below. Pulses 31 and 33 are again fed to respective inputs of phase detector 34 working into focusing indicator 35. The stroke of spur 101 is, of course, proportional to its distance from fulcrum 16 and can therefore be magnified at will.

Figure 5:
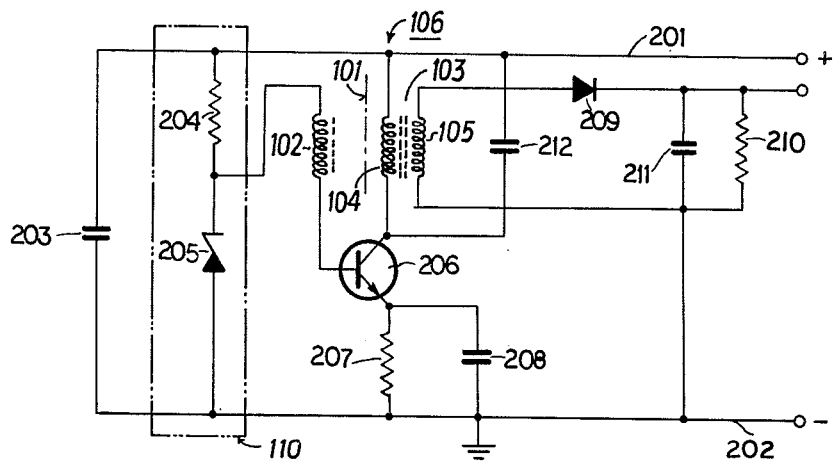
FIG. 5 is a circuit diagram of the position sensor shown in FIG. 3.

The circuit of oscillator 106, as shown in FIG. 5, comprises a d-c power supply in the form of a positive bus conductor 201 and a grounded negative bus conductor 202. Between these conductors there is connected, in parallel with a capacitor 203, a voltage divider 110 consisting of a resistor 204 in series with a Zener diode 205 whose junction is connected through winding 102 to the base of an NPN transistor 206. The emitter of this transistor is grounded through a smoothing network, consisting of a resistor 207 in parallel with a capacitor 208, while its collector is connected to positive voltage through primary winding 104 of transformer 103 whose secondary winding 105 is connected via a diode 209 across an output resistor 210 shunted by a capacitor 211. Another capacitor 212 lies in parallel with winding 104 to define therewith a tank circuit determining the frequency of oscillator 106. We have found that the use of voltage divider 110, providing a fixed biasing voltage for the transistor base, results in a practically hysteresis-free mode of operation.

Normally, with energization of supply conductor 201 upon closure of the switch 32b shown in FIG. 2, inductive feedback between windings 104 and 102 maintains the circuit 106 in an oscillatory state. When a conductor such as spur 101 (shown only schematically in FIG. 5) is interposed into the air gap between the cores of these windings, eddy currents are induced therein which weaken the electromagnetic coupling until—with a certain depth of penetration—oscillation ceases. In the present instance, the position sensor is so proportioned as to deactivate the oscillator when the clockwise-swinging mirror 15 reaches its intermediate position indicated in full lines with spur 101 approaching the axis of windings 102, 104 which are coaxially positioned as seen in FIG. 3. Pulse shaper 107, which also has an inverting function, thereupon generates the signal 33 whose coincidence with signal 31 from comparator 22 produces an in-focus signal in the output of focusing indicator 35. The appearance of this signal arrests the motor 43, e.g. via a circuit described hereinafter with reference to FIG. 15.

If, now, the object shifts from point 0 to a more remote point 0', its rays will no longer pass axially between components 94a and 94b of objective 2 but will converge toward the right so that the object is not sharply imaged anymore on film F. The light beams projected by lenses 12 and 17 upon comparator inputs 19 and 20 will now slant upwardly and downwardly, respectively, so that the two photocell arrays 21 and 21' (FIG. 2) are not identically illuminated in the full-line position of mirror 105. These patterns of illumination will be equal only in a different mirror position, such as that indicated at 15', so that signals 31 and 32 will no longer occur simultaneously. Similarly, if the object were displaced from point 0 to a closer point 0", coincidence of the illumination patterns would occur in a mirror position such as that indicated at 15".

In the first instance, therefore, pulse 33 will precede pulse 31 during the half-cycle of interest whereas in the second instance the sequence of these pulses will be reversed in the input circuit of phase detector 34. The detector produces two different output signals, e.g. voltages of opposite polarities, in dependence upon the order of arrival of pulses 31 and 33; if they arrive concurrently, it produces a third kind of output signal such as zero voltage. Phase detector 34 may be of the self-blocking kind designed to prevent a response to a second coincidence pulse 31 occurring during the return (counterclockwise) swing of lever 36; cam shaft 80 could also be operatively coupled with the phase detector to disable its input circuit during the second half of each cycle.

Position indicator 35 controls the motor 43, e.g. as described below with reference to FIG. 15, in response to the output signals of phase detector 34 to shift the lens member 3a in a compensatory sense with progressive reduction in the separation of pulses 31 and 33 until the in-focus signal appears in the output of this indicator.

If automatic refocusing is not required, as where the lens barrel 24 is manually displaceable, mirror 15 may be fixedly positioned as described hereinafter with reference to FIG. 19, with omission of position indicator 36, oscillator 106 and other elements associated therewith.

In FIG. 4A we have shown another way of controlling the oscillator 106 to produce a signal pulse whenever a light-guiding element such as mirror 15 occupies a certain position. In this instance the mirror 15 is mounted on an arm 36a terminating in a set of condenser plates 108 which are interleaved with a set of fixed condenser plates 109 so as to form a variable capacitor replacing, for example, the capacitor 212 in the tank circuit of the oscillator shown in FIG. 5. The swing of arm 36a varies the capacitance of condenser 108, 109 and thus the oscillator frequency; in a given angular position, such as that corresponding to the full-line position of mirror 15 in FIG. 3, oscillator 106 has a frequency passed by a narrow-band filter 111 here inserted between the oscillator and pulse shaper 107 (which in this case includes a rectification and integration network such as that shown at 209–in FIG. 5).

FIG. 4B shows an analogous arrangement in which an arm 36b carries a permanent magnet 108' coacting with a C-shaped iron core 109' of an inductance 109'' in the tank circuit of oscillator 106, with similar results.

Figure 8:
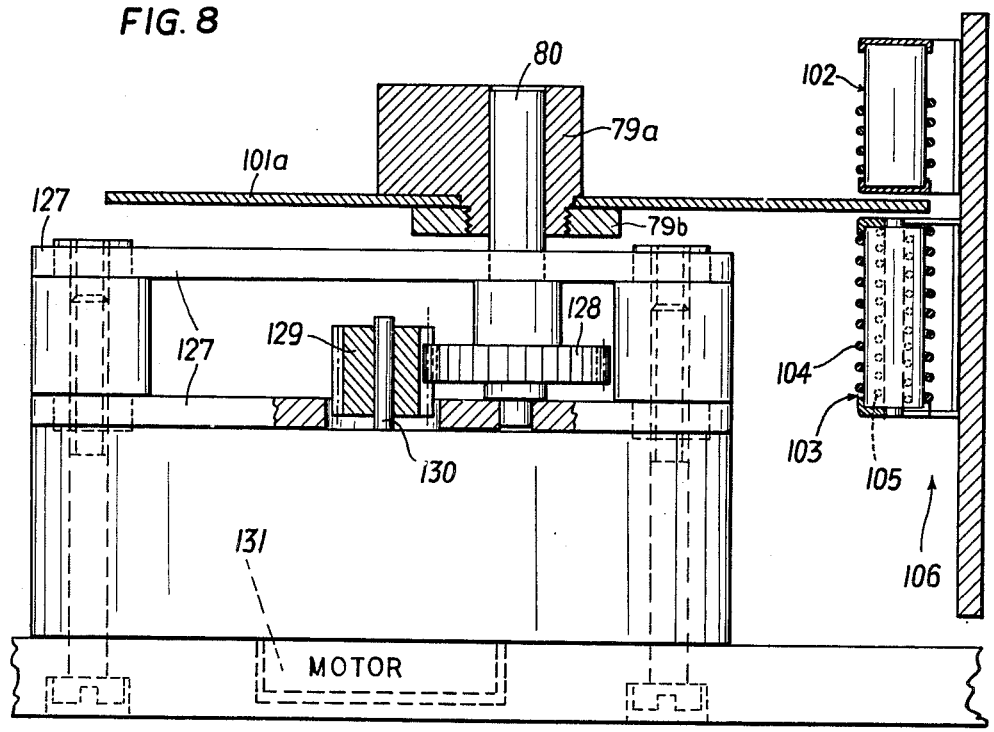
FIG. 8 is a cross-sectional view taken on the line VIII—VIII of FIG. 6.
Figure 7:
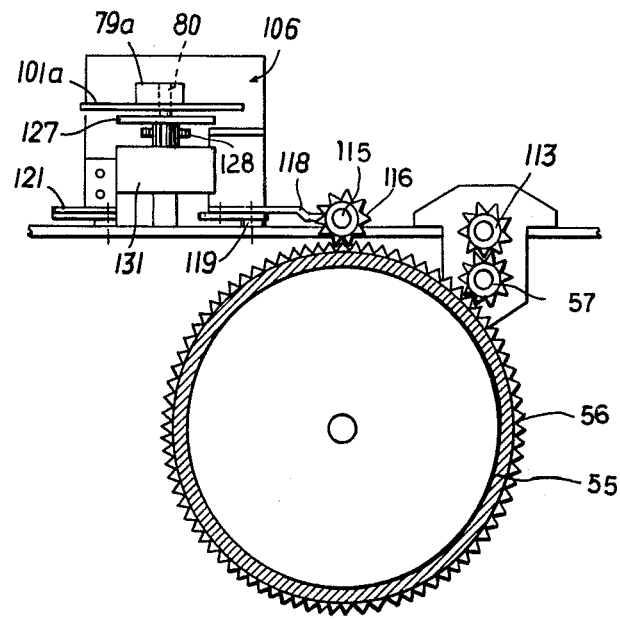
FIG. 7 is a cross-sectional view taken on the line VII—VII of FIG. 6.
Figure 6:
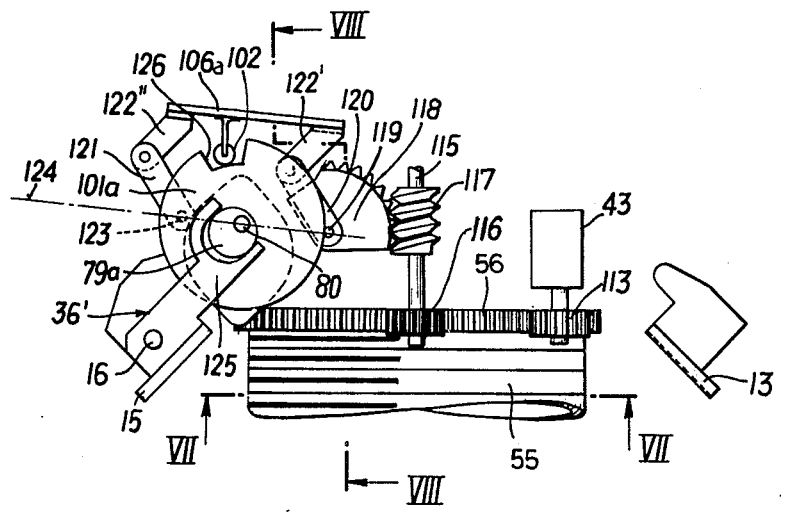
FIG. 6 shows structural details of a position sensor generally similar to the one represented in FIG. 3.

With a range finder of the type shown in FIG. 1, which is optically independent of the main camera objective 2, the position sensor 29 (FIG. 2) must be operatively coupled with the focusing mechanism of that objective in order to generate the correlation signal 33. FIGS. 6–8 show such a position sensor based on the principles discussed with reference to FIG. 5, i.e. the cutoff of a normally operative oscillator 106.

In this embodiment the decoupling element 101 of FIGS. 3 and 5, positively connected with mirror 15, is replaced by a conductive disk 101a having a peripheral cutout 126 which in the position of FIG. 6 registers with the air gap separating the inductively coupled coils 102, 104. Decoupling disk 101a is secured by a nut 79b to the cam disk 79a whose shaft 80, journaled in bearing plates 127, carries a gear 128 in mesh with a pinion 129 on a shaft 130 of a motor 131. Coils 102 and 104 (as well as the third winding 105 indicated in FIG. 3 and shown in FIG. 5) are supported on a printed-circuit plate 106a carrying the other elements of oscillator 106. Plate 106a has a pair of parallel lugs 122', 122'' articulated to respective arms 120, 121 of a parallelogrammatic linkage whose fourth side is constituted by an imaginary line 124 passing through the axes of shaft 80 and two other shafts 119 and 123 parallel thereto. Shaft 119, rigid with arm 120, has keyed to it a sectoral worm gear 118 driven by focusing motor 43 via a pinion 113 in mesh with another pinion 57 engaging gear teeth 56 on a sleeve 55 threaded into lens barrel 24 (see FIG. 11A); gear teeth 56 engage another pinion 116 on a shaft 115 which carries a worm 117 in mesh with worm gear 118. The transmission ratio of the gear coupling 116–118 between focusing sleeve 55 and shaft 119 is so chosen that coils 102 and 104 swing through a limited arc, centered on shaft 80, as the movable lens member of objective 2 is axially shifted between an infinity position and a closeup position. This motion is independent of that of decoupling disk 101a and cam disk 79a, the latter being here shown straddled by a bifurcate extremity 125 of an arm 36' carrying the swingable mirror 15.

The compact mechanism just described is flanked by the two mirrors 13 and 15 whose spacing can be freely selected to provide a satisfactory triangulation base for the range finder.

As will be apparent from the foregoing description, oscillator 106 is cut off during a major part of a swing cycle and is operative only as long as the relatively short cutout 126 registers with coils 102 and 104. The correlation pulse 33 (FIG. 2) generated by this brief burst of oscillations, after rectification and integration, varies in its time position within the cycle according to the angular position of disk 101a relative to that of plate 106a which in turn depends on the current setting of the focusing mechanism of the camera objective. For any such setting, therefore, pulse 33 indicates agreement of the front-focal length of the objective with the instant position of mirror 15.

Figure 9:
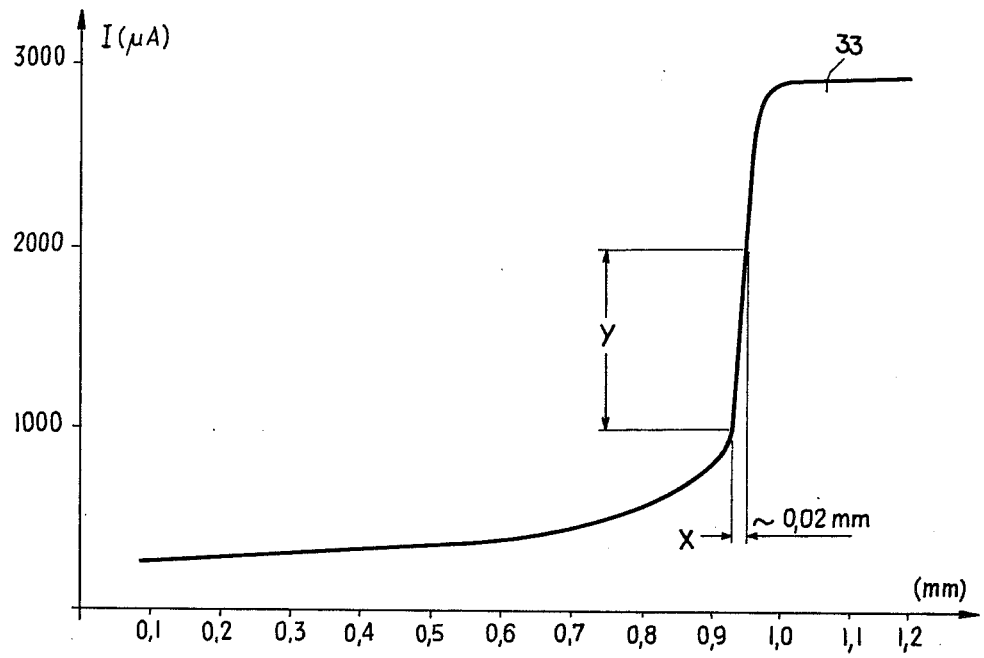
FIG. 9 is a graph relating to the operation of the position sensor of FIGS. 6–8.

In FIG. 9, which shows the leading edge of pulse 33 occurring as the forward flank of cutout 126 leaves the ares of the coils, typical numerical values have been given for the pulse amplitude as a function of the displacement of that flank from a reference position in which the oscillator 106 is blocked by the disk 101a. It will be noted that the output current I of sensor 29, e.g. as measured across resistor 210 of FIG. 5, rises from near zero to a peak of 3 mA at a rate y/x of about 1 mA per 0.02 mm of peripheral disk motion.

Figure 10:
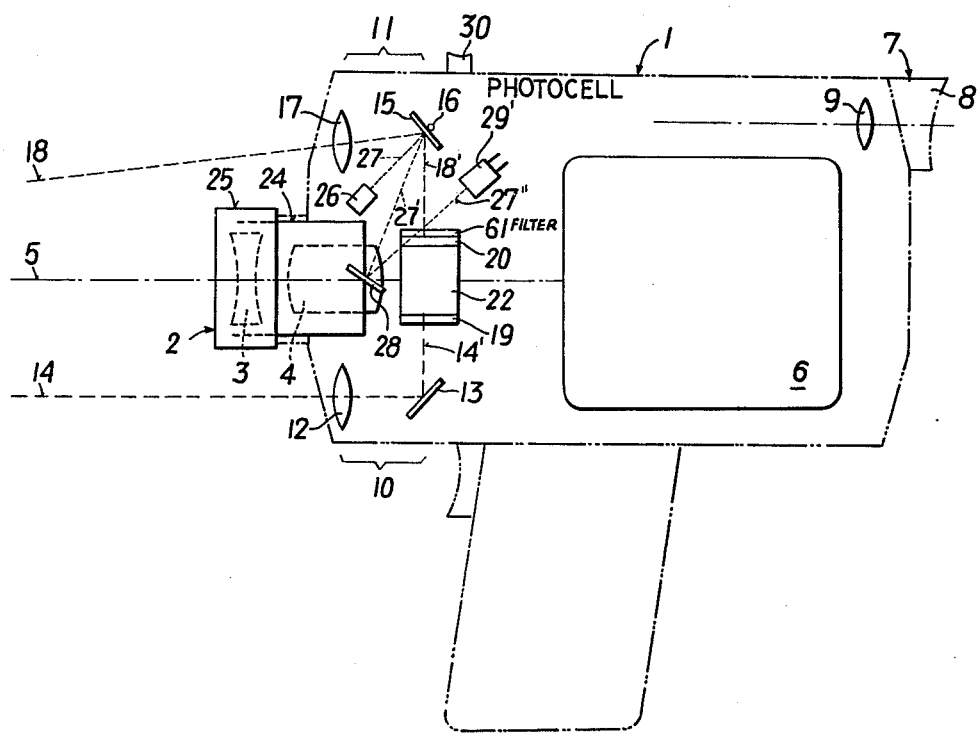
FIG. 10 is a view similar to FIG. 1, illustrating another type of position sensor.

The camera 1 shown in FIG. 10, similar to that of FIG. 1, uses an optical rather than a mechanical coupling between its swingable mirror 15 and its position sensor which is here represented by a photocell 29'. Lenses 12, 17 and mirrors 13, 15 reflect respective bundles of light rays, centered on axes 14 and 18, in the form of beams with axes 14' and 18' onto inputs 19 and 20 of comparator 22, with interposition of a filter 61 in the path of the latter beam. Filter 61 suppresses monochromatic radiation of a predetermined wavelength emitted by an auxiliary light source 26 also trained upon mirror 26, e.g. a Ga/As diode. A pencil of rays 27 from source 26 is reflected by mirror 15 along a path 27' onto another mirror 28 fixedly mounted on lens barrel 24 so as to partake of the axial motion of lens member 3; mirror 28 directs this ray bundle along a path 27'' onto photocell 29' if—the positions of mirrors 15 and 28 are so correlated that the intersection of axes 14 and 18 lies in the front-focal plane of objective 2. A correlation signal is then generated by cell 29', namely a short pulse 33 if mirror 15 is oscillated at a high frequency.

Source 26, which may comprise a lamp or a light-emissive diode, could also operate in an invisible part of the spectrum in order to avoid any interference with the incident light passing through lens 17. In principle, any of the elements (26, 28, 29') affecting the orientation of the ancillary light beam 27 can be mounted on the lens barrel 24 to determine the correlation between the focusing adjustment and the position of mirror 15.

Since the movable lens member 3 of objective 2 in FIG. 10 is in second place and of negative refractivity, its displacement for focusing upon shorter distances is toward the image plane, i.e. toward the right. The same direction of motion for mirror 28 allows for a counterclockwise tilting of mirror 15 to shift the intersection of axes 14 and 18 toward the closeup position. If, on the other hand, a positively refracting front lens is used for focusing, an opposite mirror movement will be required. This has been illustrated in FIG. 11 where the axially shiftable lens barrel 24, carrying front lens 3a, is connected with an intermediate mirror 28a via a two-arm lever 42 having a fixed pivot 41. Lens 3a is mounted in a forward extension 24' of lens barrel 24, the latter being provided with a pin 40 extending into a slot 47a of one of the lever arms; the other lever arm, carrying the mirror 28a, has a slot 47b receiving an eccentric pin 46 on a disk 45 which is secured to the shaft 44 of motor 43. Thus, a rotation of disk 45 by motor 43 axially oscillates the lens 3a as well as the mirror 28a with relatively inverted motions. Mirror 28a is here shown concave toward mirror 15 and photocell 29' of FIG. 10 to modify the paths of incident and reflected rays 27', 27'' in a manner compensating for the curvature of the mirror stroke.

Figure 11A:
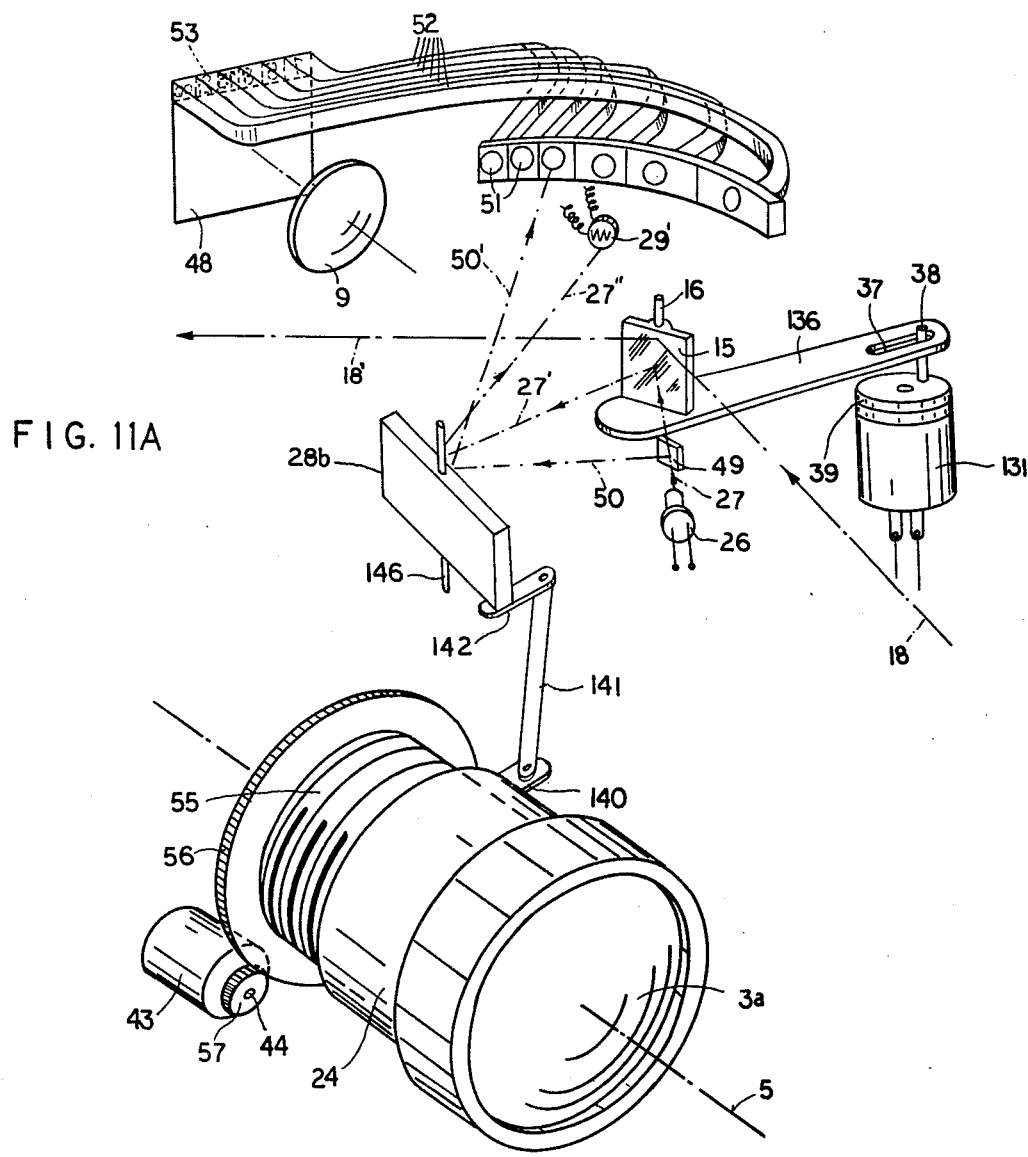
FIG. 11A is a perspective view of another modification of the position sensor of FIG. 10.

In FIG. 11A an intermediate mirror 28b is shown provided with a fixed pivotal axle 146 and connected with lens barrel 24, driven by motor 43 via pinion 57 engaging gear teeth 56 on threaded sleeve 55, by way of an articulated linkage 140, 141, 142. Mirror 15, fulcrumed at 16, is rigid with an arm 136 having at its free end a slot 37 engaged by an eccentric pin 38 on a disk 39 which is rotated by motor 131. Beam 27 emitted by source 26 is intercepted by a stationary semireflector 49 allowing part of it to proceed toward mirror 15 for reflection along paths 27', 27" toward photocell 29' by way of mirror 28b, substantially as described with reference to FIG. 10; upon proper correlation of the positions of lens 3a and mirror 15, photocell 29' is illuminated to generate the pulse 33 referred to above. Some of the light rays of beam 27 are deviated by semireflector 49 as an additional beam 50 toward mirror 28a, bypassing mirror 15, for reflection along a path 50' to a row of light receivers 51 represented by the entrance ends of a group of fiber-optical light guides 52 whose opposite ends lie in a plane 48 of a view-finder image projected by lens 9. Fiber ends 51 are disposed along an arc centered on mirror axis 46. Fiber ends 53 are advantageously juxtaposed with respective scale markings, not shown, indicating to the user the object distance upon which the objective happens to be focused. It will be noted that the paths of beams 27 and 50 are well separated from each other and lie at levels different from that of the range beam centered on axis 18'; thus, source 26 may emit visible light. Alternatively, fibers 52 may be provided at their entrance or exit ends with luminescent layers excitable by infrared or other invisible radiation from source 26. Obviously, part of that radiation could also be branched off to illuminate other indicating devices, e.g. for signaling the working condition of the power supply.

The reflecting surface of mirror 28b could also be concave, like that of mirror 28a shown in FIG. 11. Furthermore, the receiving ends 51 of optical fibers 52 could be attached to lens barrel 24 for direct illumination by the additional light rays 50 to indicate the focal distance to the user.

Figure 12:
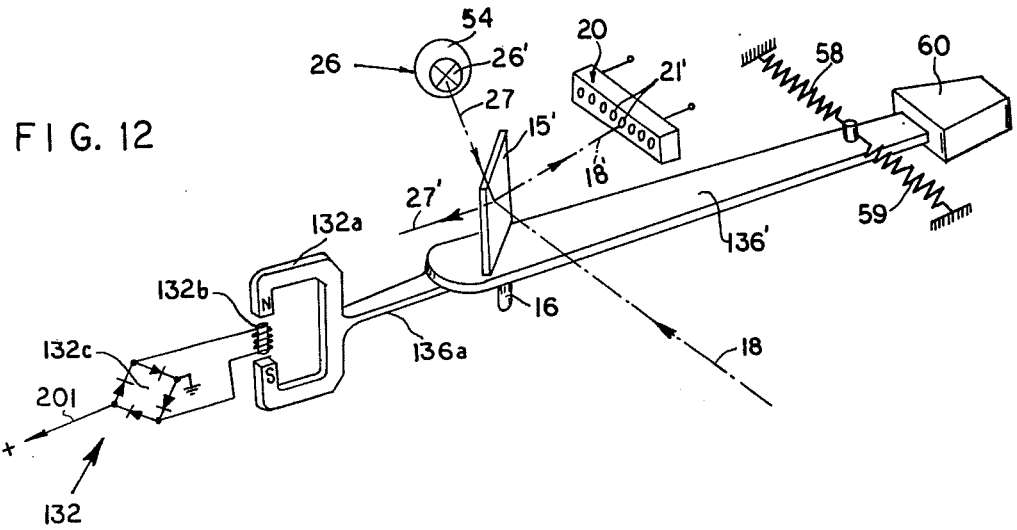
FIG. 12 is a perspective view of a further variant.

A more positive separation of the range-finding and position-sensing light paths can be had by using opposite reflecting surfaces of a swingable mirror for this purpose. In FIG. 12 we have shown such a mirror 15' with one of its surfaces reflecting the range beam represented by axes 18, 18' and the other surface reflecting the radiation 27 from source 26 which is here represented by a lamp 26' in front of a spherical or paraboloidal reflector 54.

FIG. 12 further depicts the possibility of manual instead of electrical actuation of a focusing mechanism according to our invention. Mirror 15' is mounted on an arm 136', fulcrumed at 16, which is normally held in its illustrated position by a pair of counteracting springs 58, 59. In this centered position, light from an object at middle distance falls squarely upon the photocell array 21'of comparator input 20; a knob 60 on the free end of arm 136, projecting from the nonillustrated camera housing, can be pulled to one side and then released to set the arm in oscillations of progressively decreasing amplitude. The system may otherwise be identical with that shown in FIG. 10 or 11A, for example; a similar inertial oscillating mechanism could be used for the swingable mirror 15 of FIG. 3.

The manually oscillated arm 136' could also be used in generating the electrical energy required by the various circuit components, thus providing an alternative to the power supply 32a of FIG. 2. Such an alternate power supply 132 is here shown to comprise a permanent horseshoe magnet 132a carried on an extension 136a of arm 136', a coil 132b disposed in the air gap of magnet 132a, and a full-wave reflector 132c connected across that coil. Thus, an oscillation of magnet 132a relative to coil 32b induces in the latter an alternating voltage which after rectification energizes the bus conductor 201 shown in FIG. 5.

While the use of an intermediate mirror 28, 28a, 28b coupled with the movable objective component obviates the need for flexible wiring and provides an advantageous angular magnification, we can also employ simplified ray-control means without that mirror in which either the source 26 or the associated photocell 29' is displaceable with the axially shiftable lens mount. Thus, FIG. 13 shows the photocell 29' carried on lens barrel 24 while source 26 is carried on the arm 136 supporting the swingable mirror 15; obviously, their positions could be interchanged. For the reasons discussed in conjunction with FIG. 10, the movable objective component is here a negatively refracting lens member 3 preceded by a nonillustrated positive front lens.

An advantageous circuit arrangement for sharpening the correlation pulse 33 emitted by an optical position sensor is shown in FIG. 14A. Two photoresistors 29a are connected in series with respective resistors 29b between bus conductors 201 and 202 to form a pair of voltage dividers with junctions connected in parallel to respective inputs of two amplifiers 62 and 65a, the latter being part of a comparison network 65. Amplifier 62 is of the differential type and has two output leads, each including a diode 62a, tied to one terminal of a resistor 62b whose other terminal is grounded on conductor 202. Resistor 62b is connected across the input of a zero-crossing detector 63 including a pulse former 63a in series with an inverter 63b, the latter working into one input of an AND gate 64. Network 65 further comprises a delay line 65c in series with a pulse shaper 65d; the delay line is energized from amplifier 65a via a diode 65b while the pulse shaper works into another input of AND gate 64. The output lead of amplifier 65a is grounded via a capacitor 65e in parallel with a resistor 65f.

The operation of the system of FIG. 14A will now be described with reference to FIG. 14B whose four graphs respectively show a voltage A in the input of zero-crossing detector 63, a voltage B in the output of that detector, a voltage C in the output of network 65 and a voltage D in the output of gate 64.

It will be assumed that a narrow pencil of light such as beam 27" in FIG. 10 successively sweeps across the two photoelectric transducers 29a which in their nonilluminated state have a very high resistance so that voltages A, C and D are low whereas voltage B (because of inverter 63b) is high; the diameter of the beam corresponds substantially to the physical separation of these transducers in the sweep plane so that they conduct in immediate succession. Voltage A then has the shape of a rectified sine wave with zero points at instants $t_1$, $t_2$ and $t_3$. Pulse former 63a has a threshold $V_o$ so that voltage B goes to zero whenever voltage A surpasses that level.

If the beam sweeps across transducer 29a from left to right, a noninverting input of amplifier 65a is energized during period $t_1 - t_2$ and charges the capacitor 65e positively; during period $t_2 - t_3$ the energization of an inverting input of this amplifier discharges the capacitor 65e. The capacitor charge is transmitted by line 65c, with a certain delay, to pulse shaper 65d which converts it into a single pulse C coinciding with the middle pulse of voltage B so that AND gate 64 conducts for a short period before and after time $t_2$. The resulting rise in voltage D is the correlation pulse 33. On the return sweep, capacitor 65e is driven negative during conduction of the right-hand photoresistor 29a so that the subsequent energization of the noninverting input of amplifier 65a remains ineffectual. Resistor 65f serves to prevent the accumulation of residual charges on capacitor 65e.

Thus, the circuit arrangement of FIG. 14A insures that pulse 33 is generated only once per cycle and at a time when the position-sensing beam 27 impinges substantially equally upon the two transducers 29a.

A differential amplifier suitable for use as the circuit element 62 is described, for example, in U.S. Pat. No. 3,935,524.

Reference will now be made to FIG. 15 for more detailed description of a position indicator 35 controlling the operation of a reversible motor 43 in response to output signals from phase detector 34, as discussed above with reference to FIG. 3. Output terminal 66 of detector 34 is connected on the one hand to a threshold circuit 67 and on the other hand to one input of a differential amplifier 73 whose other input is grounded. The two output leads of amplifier 73 are connected via an OR gate 74 to a square-wave generator 71 with output connections to respective inputs of a pair of AND gates 69, 70. Threshold circuit 67 works directly into the second input of AND gate 69 and through an inverter 68 into the second input of AND gate 70. The two AND gates serve for the alternate energization of a pair of inputs of a stepping-control circuit 72 through which the step motor 43 can be driven forward or backward.

Let us assume that a positive output voltage of phase detector 34 calls for forward stepping whereas a negative output voltage requires reverse stepping of motor 43. Threshold circuit 67 conducts only in the presence of positive potential on terminal 66; square-wave generator 71 operates as long as that terminal carries voltage of either polarity. With positive voltage, therefore, gate 69 is unblocked and the pulse train from generator 71 reaches the forward-stepping input of control circuit 72; with negative voltage, gate 69 is blocked and the generator pulses pass through gate 70 to the backward-stepping input of that circuit. When terminal 66 is de-energized, generator 71 is idle and motor 43 is not driven; this represents the in-focus condition.

In FIGS. 16A and 16B we have illustrated a swing-amplifying transmission for a mechanical position sensor 29 according to our invention. Lens barrel 24 is here axially reciprocated in the manner described with reference to FIG. 11, i.e. by an eccentric pin 46 of motor-driven disk 45 engaging in a slot 47' of a lever 42' having a fixed fulcrum at 41' and having a further slot 47" traversed by a pin 40 on that lens barrel. Lever 42' is extended beyond slot 47" to form a moment arm of length b several times greater than the distance a between pin 40 and fulcrum 41'. This long moment arm, accordingly, translates an axial shift of lens barrel 24 into a magnified displacement of a transverse extremity 42" of lever 42' formed with a set of rack teeth 75 which are centered on fulcrum 41' and mesh with a pinion 76 on a carrier plate 77 overlying the free end of arm 136 (cf FIG. 11A). Plate 77 has a lug 177 engaged by a spring 78 which serves to hold the teeth of pinion 76 in firm contact with one set of flanks of respective rack teeth 75, thereby eliminating any play between these teeth. The gear coupling 75, 76 translates a small axial shift of lens barrel 24 into a large displacement of plate 77.

Shaft 80 of motor 131 supports a contact disk 79 of dielectric material which carries the pin 38 engaging in the slot 37 of the swing arm 136 of mirror 15; pinion 76 has a shaft coaxial with shaft 80. Disk 79 is provided with an upper slip ring in the form of annular conductor track 81 and a lower slip ring in the form of an annular conductor track 84 engaged by respective contact brushes 85 and 86 in the input of a nonillustrated amplifier or pulse shaper; track 84 has a tongue 83 radially projecting therefrom. A conductive bridge piece on lug 177 has an upper prong 87 resting on track 81 and a lower prong 88 bearing upon the underside of disk 79 outwardly of track 84. When tongue 83 moves past the prong 88, circuit 85, 86 is momentarily closed to generate the correlation pulse 33 whose time position within a swing cycle of mirror 15 is therefore codetermined by the positions of arm 136 and lever 42'.

The length of arm 136 and the eccentricity of pin 38 are so chosen as to provide a large step-down ratio between the angular velocities of disk 79 and mirror 15, e.g. of 1:120 so that a full disk revolution corresponds to a mirror oscillation of 3°.

Figure 17:
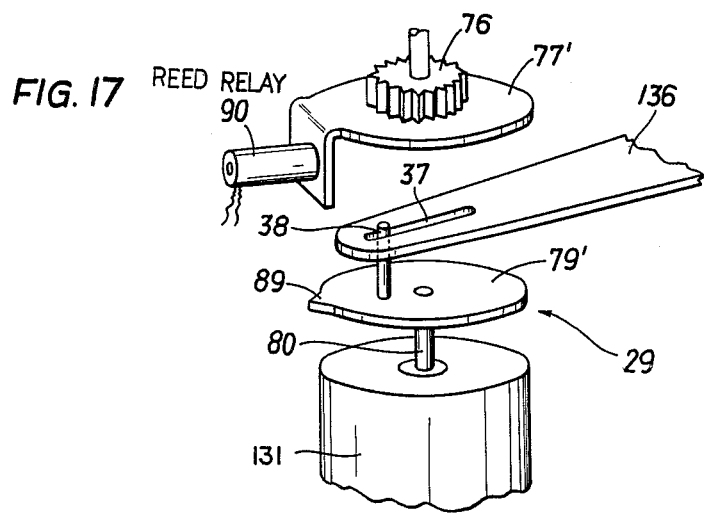
FIG. 17 is a view similar to FIG. 16B, illustrating a modification.

As shown in FIG. 17, the need for slip rings 81, 84 and contact brushes 85, 86 can be eliminated by a contactless arrangement in which a modified carrier plate 77' supports a reed relay 90 and the dielectric disk 79 is replaced by a ferromagnetic disk 79' having a projecting tongue 89. Relay 90 closes its contacts whenever the tongue 89 moves past to complete a magnetic circuit.

Figure 18:
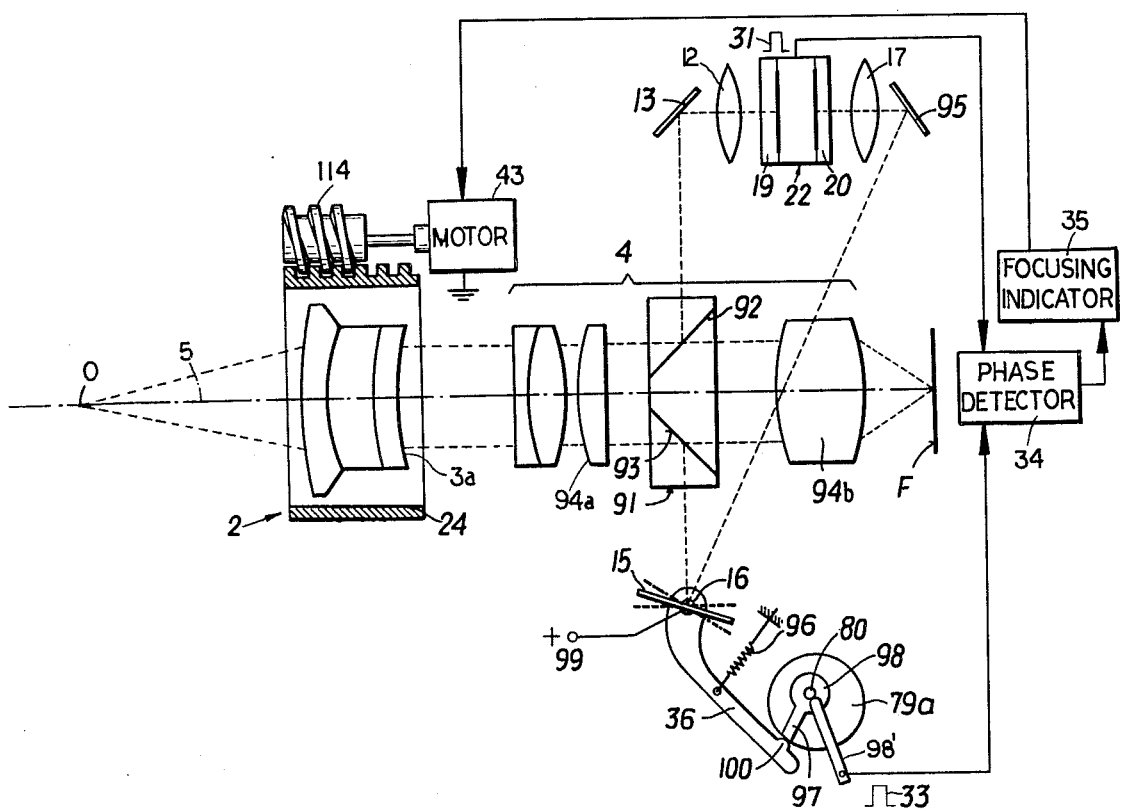
FIG. 18 is a view similar to FIG. 3, showing yet another embodiment.

The embodiment of FIG. 18 differs from that of FIG. 3 by the omission of oscillator 106 and associated circuitry; instead, cam disk 79a is made of dielectric material and carries a conductor strip 97 integral with a slip ring 98 which is contacted by a brush 98' connected to phase detector 34. Arm 36, which is metallic, is energized from a supply terminal 99 so that the correlation pulse 33 is generated whenever strip 97 sweeps past the lug 100.

In FIG. 19 the mirror 15 is fixedly positioned, as are mirrors 13 and 95, so that camparator 22 emits a coincidence pulse 31—also constituting an in-focus signal—only when lens member 3a is shifted into the correct focusing position as explained above. Pulse 31 is thus transmitted directly to focusing indicator 35 which in this instance may emit a visual signal, alerting the operator to the fact that the objective 2 is properly adjusted, and/or actuate a circuit breaker in the energizing circuit of a drive motor reciprocating the lens member 31a as indicated by an arrow A.

Naturally, an optical position indicator of the type described with reference to FIGS. 13—13 could also be used in the camera of FIG. 3 to signal the passage of mirror 15 through its full-line position.

We claim:
1. In a camera having an objective provided with setting means for varying the position of an axially shiftable lens member thereof to focus the objective upon an object along its axis, said objective further having components between which the incident light rays from an object have predetermined orientations in a position of said shiftable lens member in which the objective is focused upon such object, the combination therewith of:
a pair of ancillary projection systems intercepting incident light rays from an object in line with said objective, at least one of said projection systems including adjustable light-guiding means for varying the relative position of the intercepted light rays, said light-guiding means comprising an oscillatable element mechanically independent of said setting means, said projection systems including a pair of stationary light reflectors between said components respectively directing intercepted light rays toward said oscillatable element and toward a companion element in the other of said projection systems;

photoelectric comparison means illuminable by the intercepted light rays from said projection systems for emitting a coincidence signal whenever two images respectively produced thereby register with each other to indicate that said projection systems are trained on the same object;

sensing means responsive to the positions of said setting means and of said element for generating a correlation signal upon detecting an agreement between said positions;

scanning means coupled with said element for periodically displacing same in a succession of sweeps whereby said correlation and coincidence signals appear in the form of short pulses during each sweep; and phase-detecting means connected to said comparison means and to said sensing means for determining the relative time position of said pulses.

2. The combination defined in claim 1 wherein said oscillatable element is a mirror swingable about a fixed fulcrum.

3. The combination defined in claim 2 wherein said sensing means comprises a position indicator mechanically linked with said swingable mirror.

4. The combination defined in claim 3 wherein said sensing means further comprises an oscillation generator including impedance means controlled by said position indicator.

5. In a camera having an objective provided with setting means for varying the position of an axially shiftable lens member thereof to focus the objective upon an object along its axis, the combination therewith of:

a pair of ancillary projection systems intercepting incident light rays from an object in line with said objective, at least one of said projection systems including adjustable light-guiding means for varying the relative position of the intercepted light rays, said light-guiding means comprising a swingable mirror mechanically independent of said setting means;

photoelectric comparison means illuminable by the intercepted light rays from said projection systems for emitting a coincidence signal whenever two images respectively produced thereby register with each other to indicate that said projection systems are trained on the same object;

sensing means responsive to the positions of said setting means and of said light-guiding means for generating a correlation signal upon detecting an agreement between said positions, said sensing means comprising a position indicator mechanically linked with said swingable mirror, an oscillation generator provided with a feedback circuit including a pair of electromagnetically coupled coils, and a conductive member linked with said position indicator for selective interposition between said coils to disrupt the coupling between said coils;

scanning means coupled with said light-guiding means for periodically displacing same to explore an object space in front of said objective in a succession of sweeps whereby said correlation and coincidence signals appear in the form of short pulses during each sweep; and phase-detecting means connected to said comparison means and to said sensing means for determining the relative time position of said pulses.

6. In a camera having an objective provided with setting means for varying the position of an axially shiftable lens member thereof to focus the objective upon an object along its axis, the combination therewith of:

a pair of ancillary projection systems intercepting incident light rays from an object in line with said objective, at least one of said projection systems including adjustable light-guiding means for varying the relative position of the intercepted light rays, said light-guiding means comprising a swingable mirror mechanically independent of said setting means;

first drive means for continuously adjusting said setting means for axial reciprocation of said shiftable lens member;

second drive means independent of said first drive means for oscillating said swingable mirror at a frequency substantially exceeding the rate of reciprocation of said shiftable lens member by said setting means, said first and second drive means comprising respective motion-amplifying transmissions including a pair of coaxial disks;

photoelectric comparison means illuminable by the intercepted light rays from said projection systems for emitting a coincidence signal whenever two images respectively produced thereby register with each other to indicate that said projection systems are trained in the same object;

sensing means responsive to the positions of said setting means and of said light-guiding means for generating a correlation signal upon detecting an agreement between said positions, said sensing means comprising a pair of electrical circuit elements respectively carried on said disks for coaction in a predetermined relative angular position thereof;

scanning means coupled with said light-guiding means for periodically displacing same to explore an object space in front of said objective in a succession of sweeps whereby said correlation and coincidence signals appear in the form of short pulses during each sweep; and phase-detecting means for determining the relative time position of said pulses.

7. The combination defined in claim 6 wherein said first drive means is provided with a control circuit connected to said phase-detecting means for immobilizing said axially shiftable lens member upon concurrent appearance of said pulses.

8. The combination defined in claim 7 wherein said first drive means comprises a stepping motor reversibly energizable by said phase-detecting means.

9. In a camera having an objective provided with setting means for varying the position of an axially shiftable lens member thereof to focus the objective upon an object along its axis, the combination therewith of:

a pair of ancillary projection systems intercepting incident light rays from an object in line with said objective, at least one of said projection systems including adjustable light-guiding means for varying the relative position of the intercepted light rays, said light-guiding means comprising a swingable mirror independent of said setting means and provided with a manually actuatable inertial oscillating mechanism;

photoelectric comparison means illuminable by the intercepted light rays from said projection systems for emitting a coincidence signal whenever two images respectively produced thereby register with each other to indicate that said projection systems are trained on the same object;

sensing means responsive to the positions of said setting means and of said light-guiding means for generating a correlation signal upon detecting an agreement between said positions;

scanning means coupled with said light-guiding means for periodically displacing same to explore an object space in front of said objective in a succession of sweeps whereby said correlation and coincidence signals appear in the form of short pulses during each sweep; and phase-detecting means connected to said comparison means and to said sensing means for determining the relative time position of said pulses.

10. The combination defined in claim 9 wherein said sensing means includes electrical components, further comprising voltage-generating means coupled with said oscillating mechanism for actuation thereby to energize said electrical components.

11. In a camera having an objective provides with setting means for varying the position of an axially shiftable lens member thereof to focus the objective upon an object along its axis, the combination therewith of:

a pair of ancillary projection systems intercepting incident light rays from an object in line with said objective, at least one of said projection systems including adjustable light-guiding means for varying the relative position of the intercepted light rays, said light-guiding means comprising a swingable mirror mechanically independent of said setting means;

photoelectric comparison means illuminable by the intercepted light rays from said projection systems for emitting a coincidence signal whenever two images respectively produced thereby register with each other to indicate that said projection systems are trained on the same object;

sensing means responsive to the positions of said setting means and of said light-guiding means for generating a correlation signal upon detecting an agreement between said positions, said sensing means comprising an emitter of monochromatic radiation, a receiver for said radiation, and ray-control means for establishing a path for said radiation from said emitter to said receiver in correlated positions of said swingable mirror and said setting means;

filter means in said one of said projection systems for preventing the incidence of said monochromatic radiation upon said comparison means;

scanning means coupled with said light-guiding means for periodically displacing same to explore an object space in front of said objective in a succession of sweeps whereby said correlation and coincidence signals appear in the form of short pulses during each sweep; and phase-detecting means connected to said comparison means and to said sensing means for determining the relative time position of said pulses.

12. The combination defined in claim 11 wherein said source comprises a Ga/As diode.

13. In a camera having an objective provided with setting means for varying the position of an axially shiftable lens member thereof to focus the objective upon an object along its axis, the combination therewith of:

a pair of ancillary projection systems intercepting incident light rays from an object in line with said objective, at least one of said projection systems including adjustable light-guiding means for varying the relative position of the intercepted light rays, said light-guiding means comprising a swingable mirror mechanically independent of said setting means;

photoelectric comparison means illuminable by the intercepted light rays from said projection systems for emitting a coincidence signal whenever two images respectively produced thereby register with each other to indicate that said projection systems are trained on the same object;

sensing means responsive to the positions of said setting means and of said light-guiding means for generating a correlation signal upon detecting an agreement between said positions, said sensing means comprising an emitter of monochromatic radiation, a receiver for said radiation, and ray-control means for establishing a path for said radiation from said emitter to said receiver in correlated portions of said swingable mirror and said setting means, said ray-control means including an intermediate mirror mechanically coupled with said setting means, said path including both said swingable mirror and said intermediate mirror;

scanning means coupled with said light-guiding means for periodically displacing same to explore an object space in front of said objective in a succession of sweeps whereby said correlation and coincidence signals appear in the form of short pulses during each sweep; and phase-detecting means connected to said comparison means and to said sensing means for determining the relative time position of said pulses.

14. The combination defined in claim 13, further comprising a point of origin of additional light rays trained upon said intermediate mirror for reflection thereby and range-indicating means disposed to intercept the reflected additional light rays.

15. The combination defined in claim 14 wherein said range-indicating means comprises an array of optical fibers.

16. The combination defined in claim 15 wherein the camera is provided with a view finder, said optical fibers terminating in a viewing area of said view finder.

17. The combination defined in claim 14 wherein said point of origin is a semireflector interposed between said source and said swingable mirror.

18. In a camera having an objective provided with setting means for varying the position of an axially shiftable lens member thereof to focus the objective upon an object along its axis, the combination therewith of:
a pair of ancillary projection systems intercepting incident light rays from an object in line with said objective, at least one of said projection systems including adjustable light-guiding means for varying the relative position of the intercepted light rays, said light-guiding means comprising a swingable mirror mechanically independent of said setting means;
photoelectric comparison means illuminable by the intercepted light rays from said projection systems for emitting a coincidence signal whenever two images respectively produced thereby register with each other to indicate that said projection systems are trained on the same object;
sensing means responsive to the positions of said setting means and of said light-guiding means for generating a correlation signal upon detecting an agreement between said positions, said sensing means comprising an emitter of monochromatic radiation, a receiver for said radiation, and ray-control means for establishing a path for said radiation from said emitter to said receiver in correlated positions of said swingable mirror and said setting means, said receiver comprising photoelectric transducer means and pulse-shaping means connected to said transducer means for producing said correlation signal as a sharp pulse occurring upon symmetrical illumination of said transducer means by said radiation, said transducer means including a pair of photoresistors and a differential amplifier with inputs respectively connected to said photoresistors and with an output circuit connected to said pulse-shaping means;
scanning means coupled with said light-guiding means for periodically displacing same to explore an object space in front of said objective in a succession of sweeps whereby said correlation and coincidence signals appear in the form of short pulses during each sweep; and
phase-detecting means connected to said comparison means and to said sensing means for determining the relative time position of said pulses.

19. In a camera having an objective provided with setting means for varying the position of an axially shiftable lens member thereof to focus the objective upon an object along its axis,
the combination therewith of:
a pair of ancillary projection systems intercepting incident light rays from an object in line with said objective, at least one of said projection systems including adjustable light-guiding means for varying the relative position of the intercepted light rays, said light-guiding means comprising a swingable mirror mechanically independent of said setting means;
photoelectric comparison means illuminable by the intercepted light rays from said projection systems for emitting a coincidence signal whenever two images respectively produced thereby register with each other to indicate that said projection systems are trained on the same object;
sensing means responsive to the positions of said setting means and of said light-guiding means for generating a correlation signal upon detecting an agreement between said positions, said sensing means comprising an emitter of monochromatic radiation, a receiver for said radiation, and ray-control means including a surface of said swingable mirror for establishing a path for said radiation from said emitter to said receiver in correlated positions of said swingable mirror and said setting means;
scanning means coupled with said light-guiding means for periodically displacing same to explore an object space in front of said objective in a succession of sweeps whereby said correlation and coincidence signals appear in the form of short pulses during each sweep; and
phase-detecting means connected to said comparison means and to said sensing means for determining the relative time position of said pulses.

20. The combination defined in claim 19 wherein said swingable mirror has a first reflecting surface confronting said object and a second reflecting surface confronting said source.

21. In a camera having an objective including first, second and third lens members air-spaced along an optical axis and setting means for varying the position of said first lens member to focus the objective upon an object along its axis with establishment of a field of parallel light rays from said object between said second and third lens members,
the combination therewith of:
a pair of ancillary projection systems including two stationary light reflectors interposed between said second and third lens members for directing part of the light rays from said object away from said axis in the form of a first beam and a second beam; and
photoelectric comparison means illuminable via said projection systems by said first and second beams for emitting an in-focus signal in response to a coincidence of images produced by said projection systems, such coincidence being indicative of the presence of said field of parallel light rays.

22. The combination defined in claim 21 wherein said reflectors are a pair of semireflecting prism surfaces.

23. The combination defined in claim 21 wherein said first lens member is positively refracting and constitutes a front component of said objective.

* * * * *